United States Patent Office 3,743,668
Patented July 3, 1973

3,743,668
CYANOETHYLATION OF AMINOPHENOLS
Daniel F. Scully, St. Louis, Mo., assignor to
Mallinckrodt Chemical Works, St. Louis, Mo.
No Drawing. Filed June 1, 1971, Ser. No. 148,988
Int. Cl. C07c *121/78*
U.S. Cl. 260—465 E          7 Claims

ABSTRACT OF THE DISCLOSURE

Excellent yields of monocyanoethylated and dicyanoethylated aminophenols can be obtained by admixing acrylonitrile with aqueous solutions of aminophenol salts such as potassium aminophenate. No other catalyst or solvents are required. The reaction proceeds exothermically at temperatures as low as 0° C. and the process may be operated advantageously up to temperatures of about 100° C.

BACKGROUND OF THE INVENTION

This invention relates to the field of organic chemical processes and more particularly to the preparation of N-cyanoethylated aminophenols.

Cyanoethylated aminophenols are known to have many useful properties. For example they may be used as intermediates for the preparation of a wide range of useful polymers and copolymers, for the synthesis of pharmaceuticals, etc.

It has been known that aminophenols could be cyanoethylated by reacting acrylonitrile with the aminophenol in the presence of an acid catalyst such as acetic acid or a copper salt such as cupric acetate and preferably also in the presence of an inert solvent such as dioxane. The yields obtainable using this method have, however, tended to be poor in part because of the incomplete reaction and in part because of the formation of undesirable side products, including sometimes indeterminate but significant amounts of dicyanoethylated aminophenol. While more or less satisfactory for preparing the monocyanoethylated derivative, the process is not efficient for preparing the pure dicyanoethylated product when that is desired. Finally, some cyanoethylation of the phenolic group as well as the amine group may occur.

Certain basic catalysts such as choline were also known to be effective for cyanoethylating certain aromatic amines but they are not satisfactory for the cyanoethylation of aminophenols.

GENERAL DESCRIPTION

Among the objects of the present invention may be noted the provision of an improved process for preparing N-substituted derivatives of aminophenols and more particularly N-cyanoethylated derivatives of o-, m-, and p-aminophenol. Another object of the invention is to provide a process for preparing either mono- or di-cyanoethylated aminophenols in substantially pure form, or mixtures of the two in predetermined proportions. A still further object is to provide methods of the character described which do not require the presence of an organic solvent or a foreign catalytic material. Other objects and features will be in part apparent and in part pointed out hereinafter.

The invention accordingly comprises the methods hereinafter described, the scope of the invention being indicated in the following claims.

The present invention is directed to a process for preparing N-substituted aminophenols having the structure

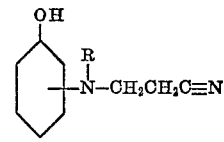

where R is hydrogen or 2-cyanoethyl, which comprises admixing acrylonitrile with an aqueous solution of a water-soluble salt of an aminophenol selected from o-, m-, and p-aminophenol while maintaining the temperature of the reaction mixture below about 100° C. and thereafter neutralizing the reaction mixture to liberate the resulting free N-substituted aminophenol.

The aqueous aminophenate solution should be sufficiently basic to obtain complete solubilization of the aminophenol, but not so basic as to cause hydrolysis of the acrylonitrile. The preferred pH is therefore approximately 11.5–12.0.

The concentration of the aminophenate solution may vary depending upon the solubility of the particular aminophenate employed, the temperature of the reaction mixture and other considerations. In the case of potassium aminophenates, for example, the concentration advantageously is in the range between 25% and 40% by weight.

DESCRIPTION OF THE PREFERRED EMBODIMENTS

For the purposes of the present invention an alkali metal salt of the aminophenol such as the sodium or potassium salt is ordinarily preferred. However any salts having substantial solubility in water can be used. Among such other useful salts may be mentioned the ammonium salts and other amine salts such as the mono-, di- and trimethylamine salts.

The concentration of the aqueous aminophenol solution is preferably as high as can conveniently be prepared and maintained. The reaction mixture, especially the aminophenol salt, is somewhat sensitive to oxidation. Therefore the reaction is advantageously carried out in a nitrogen or other inert atmosphere to minimize formation of colored byproducts, but that is not essential.

Acrylonitrile reacts exothermically with the water-soluble aminophenol salt even at temperatures as low as about 0° C. The process of this invention is therefore preferably carried out by gradually adding the acrylonitrile to the aqueous solution of the aminophenol salt, while cooling the reaction vessel if necessary to maintain the temperature below about 100° C., preferably between 10° and about 60° C. Too rapid addition of the acrylonitrile may result in its polymerization with consequent loss of the reactant and lower yield of the desired product.

Under these conditions the acrylonitrile reacts with the water-soluble aminophenate readily and substantially completely. If equimolar amounts of the acrylonitrile and the water-soluble aminophenol salt are reacted the resulting product will be substantially pure mono-cyanoethylated aminophenol. Di-cyanoethylation of the aminophenol does not occur to any significant degree until mono-cyanoethylation is substantially complete. By controlling the amount of acrylonitrile which is added to the water-soluble aminophenate, either the mono-cyanoethylated or di-cyanoethylated derivative can be prepared. It is also obviously possible to prepare mixtures of the mono- and di-substituted aminophenol in predetermined proportions if that is desired. When preparing the dicyanoethylated derivative a small excess of the acrylonitrile over and above the stoichiometric requirement is advantageous both to insure maximum yield and shorten the reaction time.

The preferred method of admixing reactants is by gradually adding, either continuously or in small increments, the acrylonitrile to the aminophenate solution. The temperature may then be readily controlled by adjusting the rate at which the acrylonitrile is added and/or by cooling the reaction vessel. It is not necessary to heat the aminophenate solution in order to initiate the reaction as has been customary with prior methods.

According to the method of the present invention the desired reaction takes place substantially completely with minimal side reactions. It is therefore more economical with respect to utilization of starting materials. Moreover there is no difficult and expensive recovery of solvents or disposal of waste materials in the form of useless byproducts.

The following examples illustrate the invention.

EXAMPLE 1

3-(p-hydroxyanilino)propionitrile

In a one-liter, 3-neck flask provided with a stirrer, a condenser, a thermometer and a dropping funnel, 109 g. (one mole) of p-aminophenol was suspended in 300 ml. of water. To this suspension was added 120 g. of a 50% solution of potassium hydroxide. A clear, dark colored solution having a pH of 11.5–12.5 resulted. To it was then added slowly 53 g. (one mole) of acrylonitrile over a 2-hour period. During this addition the temperature rose to 50° C. The reaction mixture was stirred for 3 hours and then 88 g. of 36% HCl were added. The pH was then 7.5. The product first separated as an oil which on cooling changed to shiny black crystals (M.P. 86° C.) weighing 142 g. (87% yield). The product was 3-(p-hydroxyanilino)propionitrile.

EXAMPLE 2

3,3'-(p-hydroxyanilino)dipropionitrile

The procedure described in Example 1 was repeated, except that 159 g. (3 moles) of acrylonitrile were added. The temperature rose to 56° C. during the course of the addition. After neutralization with acid the mixture separated into two layers, the lower being an oil consisting essentially of the desired product. This oil was separated and washed with several portions of water to remove salts and other water-soluble impurities. The oil was then seeded with crystals of the pure product and chilled. Crystallization may be initiated by other commonly known techniques if no such crystals are available. The crystallized product was in the form of a very viscous slush, which was made stirrable and filterable by adding a little isopropanol. Other suitable solvents such as butanol can be employed. The product was further purified by recrystallization from isopropanol. By this method 128 g. of crystals melting at 78° C. were obtained. The product was 3,3'-(p-hydroxyanilino)dipropionitrile.

EXAMPLE 3

3-(p-hydroxyanilino)propionitrile

In a one-liter, 3-neck flask provided with a stirrer, a condenser, a thermometer and a dropping funnel, 109 g. (one mole) of p-aminophenol was suspended in 100 ml. of water and 200 ml. of 30% trimethylamine solution. To it 1 mole (53 g.) of acrylonitrile was slowly added over a period of two hours, and the reaction mixture was stirred for an additional two hours. The pH of the mixture was adjusted to 7.5 by adding 88 g. of 36% HCl. An oil separated, which crystallized when cooled to room temperature. An 80% yield of 3-(p-hydroxyanilino)propionitrile crystals melting at 86° C. was thereby obtained.

EXAMPLE 4

3-(m-hydroxyanilino)propionitrile

The procedure described in Example 1 was repeated except that 109 g. of m-aminophenol was used. In this way was obtained 129 g. (80% yield) of 3-(m-hydroxyanilino)propionitrile as an oil.

EXAMPLE 5

3,3'-(m-hydroxyanilino)dipropionitrile

In a one-liter, 3-neck flask provided with a stirrer, a condenser, a thermometer and a dropping funnel, 109 g. (one mole) of m-aminophenol was suspended in 300 ml. of water and to it was then added 120 g. of a 50% KOH solution. To the resulting clear dark solution (pH 11.5–12.5), 132 g. (2.5 moles) of acrylonitrile was slowly added over a two-hour period. The temperature rose to 55° C. during the latter addition. The reaction mixture was stirred for an additional three hours, and the pH was adjusted to 7.5 by adding 88 g. of 36% HCl. The product separated as a dark colored oil weighing 213 g. It was 3,3'-(o-hydroxyanilino)dipropionitrile.

EXAMPLE 6

3-(o-hydroxyanilino)propionitrile

The procedure described in Example 1 was used except that o-aminophenol was substituted for p-aminophenol. An 85% yield of 3-(o-hydroxyanilino)propionitrile (M.P. 111° C.) was obtained.

EXAMPLE 7

3,3'-(o-hydroxyanilino)dipropionitrile

The procedure described in Example 2 was followed except that o-aminophenol was substituted for p-aminophenol. The product separated as an oil, weighing 210 g., whose infrared spectrum showed it to be completely cyanoethylated o-aminophenol (3,3'-(o-hydroxyanilino)dipropionitrile).

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A process for preparing an N-cyanoalkylated aminophenol having the structure

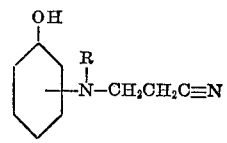

where R is hydrogen or 2-cyanoethyl, which comprises admixing acrylonitrile with an aqueous solution of a water-soluble salt of an aminophenolic salt having a pH of approximately 11.5–12.5 while maintaining the temperature below about 100° C., and thereafter neutralizing the reaction mixture to liberate the resulting free N-substituted aminophenol.

2. A process according to claim 1 in which R is hydrogen and the proportion of acrylonitrile is substantially equivalent to the amount of aminophenolic compound.

3. A process according to claim 2 in which the temperature is maintained below about 60° C.

4. A process according to claim 2 in which the aminophenolic compound is a potassium salt of an aminophenol.

5. A process according to claim 2 in which the aminophenolic compound is a trimethylamine salt of an aminophenol.

6. A process according to claim 1 in which R is 2-cyanoethyl and the proportion of acrylonitrile is in excess of two equivalents to the amount of aminophenolic compound.

7. A process according to claim 6 in which the temperature is maintained below 60° C.

References Cited
UNITED STATES PATENTS 3,231,601   1/1966   Peterli _____ 260—465

LEWIS GOTTS, Primary Examiner

D. H. TORRENCE, Assistant Examiner